June 3, 1952     P. MAUBORGNE     2,599,189
LINE PICKUP DEVICE FOR FISHING
REEL HAVING NONROTARY DRUMS
Filed Dec. 5, 1945
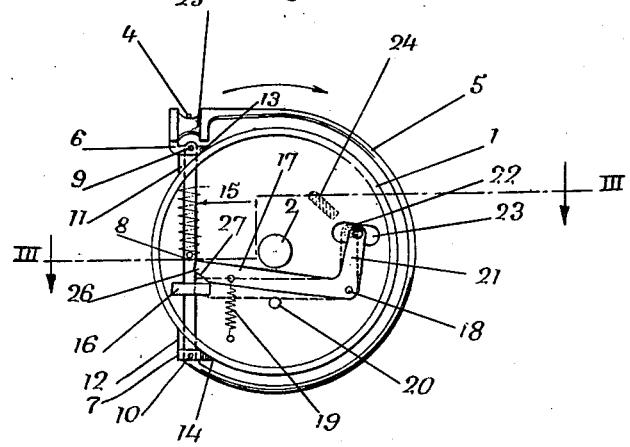
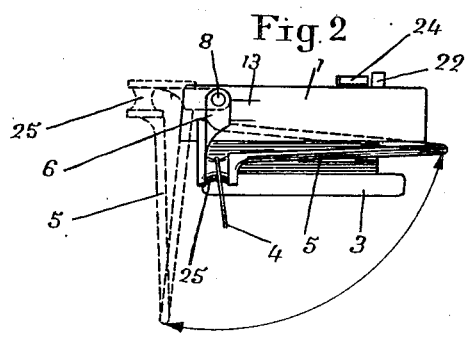
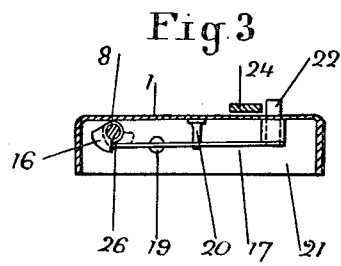
Inventor:
Paul Mauborgne
By Robic & Bastien
Attorneys Patented June 3, 1952

2,599,189

UNITED STATES PATENT OFFICE 2,599,189

LINE PICKUP DEVICE FOR FISHING REEL HAVING NONROTARY DRUMS

Paul Mauborgne, Niort, France

Application December 5, 1945, Serial No. 632,832
In France July 16, 1942

Section 1, Public Law 690, August 8, 1946
Patent expires July 16, 1962

2 Claims. (Cl. 242—84.1)

This invention relates to a line pick-up device for fishing reels of the type having a non-rotary drum or bobbin. More particularly, my invention relates to a pick-up device for the line which is employed in association with a flyer, the pick-up, in the form of a wire loop, being pivoted on the flyer.

In fishing reels having a non-rotary drum, that is, a drum which does not rotate as the bait is cast, the line is rewound on the drum by an automatic (or non-automatic) pick-up. In the automatic devices, the pick-up grasps the line when the crank of the reel is actuated by the fisherman, and winds the same on the bobbin. In non-automatic reels, the pick-up may be actuated by a manually-operated handle.

The device according to the invention includes a fishing reel having a stationary drum and a flyer rotatably associated therewith. The drum holds the line, and a ringlike buckle or wire loop, surrounding the drum, is pivoted on the flyer, being mounted on a spindle journalled in the latter. By means of this pivotable spindle, the pick-up device may be pivoted into an operative position in a plane at right angles with the axis of the drum and flyer, or into an inoperative position in a plane at right angles with the operative position.

According to the invention, convenient bearings and abutments are provided for the spindle to control the movements thereof, and convenient means are provided in the flyer for engaging the part of the spindle therein, thereby controlling the movement of the pick-up from inoperative to operative positions, and the locking and unlocking of the pick-up at these positions.

The main object, then, of the invention resides in the provision of a line pick-up device for a fishing reel having a non-rotary drum, and a flyer associated therewith, in which means for controlling the rotation of the pick-up from inoperative to operative position, are housed in the flyer.

Another important object resides in the provision of a pick-up device for a fishing reel of the character described, in which the flyer and the parts rotating with the same can be balanced because of the possibility of disposing these parts in a suitable manner within the flyer thereby requiring no further addition of balance weights which would increase the weight of the reel.

Yet another object resides in the provision of a pick-up device for fishing reel, of the character described, having spring means for urging and maintaining the pick-up in operative position.

Other objects and advantages will become apparent, or be further pointed out, in the description to follow.

As an example, and for purposes of illustration only, a preferred embodiment of the invention is shown in the annexed drawings, wherein:

Figure 1 shows an elevation view of the flyer and the pick-up associated therewith;

Figure 2 shows a side view of the reel of Figure 1; and

Figure 3 is a cross section along the line III—III of Figure 1.

Referring to the drawings, wherein the same reference characters denote corresponding parts throughout, the reel comprises, as usual, a flyer 1 journalled on a stationary shaft 2 to which is also secured the drum 3 (Fig. 2) or bobbin which accommodates the fishing line 4.

The pick-up device is constituted by a ring 5 which surrounds the flyer 1 for at least a part of the periphery thereof and is provided at its ends with brackets 6 and 7 which latter are secured on the ends of a spindle 8, for instance, by means of pins 9 and 10. The spindle is journalled in bearings 11 and 12, preferably formed on the flyer 1. The abutments 13 and 14 (Figs. 1 and 2) are preferably provided on the flyer for determining the location of the pick-up 5 when in operative position for winding up the line upon the drum.

A spring such as 15 may be wound around the spindle 8 and would tend, owing to torsional stress, to force the brackets 6 and 7 against their respective abutments 13 and 14.

At any convenient location on spindle 8 is formed a cam 16 which limits the displacement of a swivelling lock 17. This latter swivels on a pivot 18 and is provided with a spring 19 (Fig. 1) which tends to keep said lock in the position shown in Fig. 1, i. e., in contact with the cam 16. An abutment 20 limits the swivelling of the lock 17 in the lower part of its course. Said lock possesses a branch 21 at right angles with the main body, and said branch 21 has a finger 22 which engages a slit 23 in the wall of the flyer 1, and a profiled abutment 24. This abutment 24 may be formed on the casing or other non-rotatable parts (not shown) of the reel, and will then constitute an unlocking device located in the path of said finger 22.

One end of the pick-up 5 carries a roller 25, which is designed for lessening the wear on the line 4.

The parts being in the position shown in dotted lines in Fig. 2, the line 4 is freed and has no longer any contact with the pick-up, so that it is in a position to freely unwind from the bobbin 3. In this position, the cam 16 (Figs. 1 and 3) which is in the position shown in full lines in Fig. 3, allows the lock 17 to abut against the stopping piece 20. The end 26 of the lock, being then placed in front of the boss of the cam 16, prevents any rotation of said cam, so that the pick-up is kept in the opened position shown in dotted lines in Fig. 2.

When the flyer 1 is rotated in the direction of the arrow of Fig. 1, as for instance by a crank (not shown), the finger 22 is brought into contact with the stationary unlocking abutment 24, and thus the lock 17, in the form of a bent lever, pivots about 18 from the position shown in dotted lines in Fig. 1 to the position shown in full lines in the same figure. The end 26 of the lock then frees the cam 16, so that the spring 15 may rotate the spindle 8 and bring the pick-up into the operative position (abutting with 13 and 14) shown in full lines in Figs. 1 and 2.

The lock 17 is preferably formed with a taper 27 at the end thereof in order to brake the action of the spring 15 when the cam 16 is freed. Such a design aids in avoiding a violent shock of the movable parts against the abutments 13 and 14. It is, of course, possible to arrange any other device for braking or belating the closing, and a hand controlled device or the like could be used instead of the automatic one described.

The described arrangement offers the advantage that the unit constituted by the several parts of the pick-up allows a convenient distribution of the parts such that the static balance of the flyer carrying the pick-up is not broken, thus avoiding the adjustment of additional balancing masses on the flyer as has been found necessary in some cases in the art and has uselessly increaed the weight of the reel.

The several parts may be made of any convenient material, such as metal or plastic or the like, the pick-up being pivoted at any desired place on the flyer, provided that the spindle to which it is secured does not pass through the axis of the flyer.

From the foregoing description, it will be apparent that the line pick-up device according to the invention fulfills the objectives hereinbefore set forth, and that the size, shape and arrangement of parts of the invention may be varied for application to any fishing reel having a non-rotary drum according as to particular use desired.

What I claim is:

1. In a fishing reel having a non-rotary drum, and a flyer co-axial therewith, a pick-up device comprising: a wire loop, a spindle rotatably housed in said flyer perpendicular to and remote from the axis thereof, said loop secured to said spindle, a spring secured between said flyer and said spindle tending to pivot the latter to bring the loop into operative position encircling the drum, a cam on said spindle, and a lever pivotally secured in the flyer releasably engageable with said cam to prevent rotation of the spindle and to hold the loop in an inoperative position remote from the drum.

2. In a fishing reel having a non-rotary drum, a flyer co-axial therewith and a non-rotatable reel housing, a pick-up device comprising: a wire loop, a spindle rotatably secured in said flyer perpendicular to and remote from the axis thereof, said loop secured to said spindle, a spring secured between said flyer and said spindle tending to rotate the latter to bring the loop into operative position encircling the drum, a cam on said spindle, a lever pivotally secured in the flyer having one end engageable with the cam to lock the spindle and hold the loop in an inoperative position remote from the drum, a finger integral with the other end of said lever projecting from said flyer, and a projection on said reel housing in the path of said finger; whereby rotation of the flyer causes said projection to displace said finger and to disengage the lever from the spindle cam.

PAUL MAUBORGNE.

REFERENCES CITED

The following references are of record in the file of this patent:

UNITED STATES PATENTS

| Number | Name | Date |
|---|---|---|
| 2,314,616 | Gaire | Mar. 23, 1943 |

FOREIGN PATENTS

| Number | Country | Date |
|---|---|---|
| 380,939 | Great Britain | Sept. 29, 1932 |